(12) United States Patent
Jack

(10) Patent No.: US 6,842,535 B1
(45) Date of Patent: Jan. 11, 2005

(54) IMAGING SYSTEM

(75) Inventor: James W Jack, Edinburgh (GB)

(73) Assignee: BAE Systems Avionics Limited, Farnborough (GB)

( * ) Notice: Subject to any disclaimer, the term of this patent is extended or adjusted under 35 U.S.C. 154(b) by 621 days.

(21) Appl. No.: 09/700,809

(22) PCT Filed: Sep. 27, 2000

(86) PCT No.: PCT/GB00/03706
§ 371 (c)(1),
(2), (4) Date: Nov. 20, 2000

(87) PCT Pub. No.: WO01/23849
PCT Pub. Date: Apr. 5, 2001

(30) Foreign Application Priority Data

Sep. 30, 1999 (GB) .............................. 9923013

(51) Int. Cl.⁷ ................................. G06K 9/00
(52) U.S. Cl. ........................................ 382/162
(58) Field of Search .................... 382/100, 162; 702/1, 127; 356/451, 453, 456, 460, 478, 481, 491, 517

(56) References Cited

U.S. PATENT DOCUMENTS

| | | | | |
|---|---|---|---|---|
| 3,977,787 A | | 8/1976 | Fletcher et al. | |
| 3,989,938 A | * | 11/1976 | Auth | 702/24 |
| 5,239,488 A | * | 8/1993 | Markham et al. | 702/135 |
| 5,311,273 A | * | 5/1994 | Tank et al. | 356/43 |
| 5,528,368 A | | 6/1996 | Lewis et al. | |
| 5,539,517 A | | 7/1996 | Cabib et al. | |
| 5,539,518 A | | 7/1996 | Bennett | |
| 5,729,622 A | * | 3/1998 | Csipkes et al. | 382/151 |
| 5,759,781 A | * | 6/1998 | Ward et al. | 435/6 |
| 5,777,736 A | | 7/1998 | Horton | |
| 5,991,028 A | * | 11/1999 | Cabib et al. | 356/456 |
| 6,007,996 A | * | 12/1999 | McNamara et al. | 435/6 |
| 6,165,734 A | * | 12/2000 | Garini et al. | 435/7.21 |
| 6,233,054 B1 | * | 5/2001 | Theriault | 356/451 |
| 6,266,428 B1 | * | 7/2001 | Flanigan | 382/100 |

FOREIGN PATENT DOCUMENTS

| | | |
|---|---|---|
| EP | 0 767 361 | 4/1997 |
| WO | WO 99/28856 | 6/1999 |

* cited by examiner

Primary Examiner—Jose L. Couso
(74) Attorney, Agent, or Firm—Nixon & Vanderhye P.C.

(57) ABSTRACT

An imaging system is provided where radiation from object space (2) is incident on an array of detector elements (8) via an interferometer (3), the interferometer (3) Being scanned such that the output of each pixel comprises an interferogram B generated from the radiation received from a corresponding region of object space (2), enabling image data to be generated in dependence on the output of the pixels, which image data is derived from the spectral radiance associated with each pixel.

14 Claims, 3 Drawing Sheets

IMAGING SYSTEM

This application is the US national phase of international application PCT/GB00/03706, filed in English on 27 Sep. 2000, which designated the U.S. PCT/GB00/03706 claims priority to GB Application No. 9923013.8 filed 30 Sep. 1999. The entire contents of these applications are incorporated herein by reference.

The present invention relates to an imaging system and more particularly to an imaging system suitable for the detection and classification of objects or gases using spectral radiance.

Cameras, whether they be conventional TV type cameras or infra-red cameras typically rely on generating an image dependant on the received intensity of radiation. However in addition to intensity a point in object space can also be characterised by its spectral radiance and polarisation.

There are a number of devices which enable spectral radiance to be detected, one type being preferentially doped large scale focal plane (EPA) arrays. FPA's can be doped in a manner which enhances the spectral response of certain pixels and is fixed at manufacture. Typically columns of detector elements are doped to have identical and defined narrow spectral responses. Over the full width of the array several sets of columns are provided to cover the waveband of interest, such devices being manufactured to cover the three to five and eight to twelve micron bands. The detector array operates as a set of long linear arrays and is scanned across the image to collect data at all relevant sub-bands to form a complete image. This provides an output which is in effect a set of images at each of the wavelengths of the sub-bands. A disadvantage of the above system is that it requires a mechanical scanning device which is expensive, requires a significant power supply, poses a reliability problem and also requires a housing of sufficient dimensions for the scanning mechanism, all of which may be undesirable in some applications, particularly military applications.

A second type of imager by which an image may be generated based on spectral radiance employs a filter wheel placed directly in front of a focal plane array or wide band camera. The filter wheel contains a number of filters each having a narrow sub-band transmission and these filters are placed in front of the detector in sequence to generate a series of separate images one for each sub-band. Again the use of a rotating filter wheel is not desirable and also with this system the image may require several cycles of the filter wheel to allow an integration to take place because the integration time for each sub-band will be short to ensure that the complete set of sub-bands is sampled in a short time compatible with a CCIR TV format (frame Rate 25 Hz). With 10 or 12 sub-bands the time interval between separate sub-band samples is typically of the order of 0.5 of a second and is fixed. The time interval between separate samples through the sub-band is also long and fixed and the disadvantage of this is that the lack of flexibility prevents the sub-bands in which "contrast" or target discriminant has been detected being revisited more frequently.

A third imager type used in satellite applications employs an interferometric technique which is optimised for specific wavelengths and is subject to a set of unique constraints related to operation in space where there is no vibration environment to cause misalignment (except at launch), no atmosphere attenuation within the instrument, and the interferometer is only likely to be scanned if a range of wavelengths are to be examined, otherwise it could be fixed or tuned.

According to the present invention there is provided an imaging system comprising an aperture for receiving radiation from object space, an interferometer a such that radiation received through the aperture is incident thereon, an array of detector elements for receiving output radiation from the interferometer, a controller arranged to scan the interferometer through a range of different path lengths and a processor for receiving signals from a plurality of elements of the array, the process determining a spectral radiance for each of a plurality of pixels, each pixel corresponding to one or more elements of the array, and generating image data, the grey scale of which is determined by the spectral radiance of each pixel.

By employing the present invention the spectral radiance, the wavelength of photons received by the imaging system, can be accurately determined to a resolution determined by the length of the interferometer arms but constrained to a reasonable value by typical size constraints appropriate to airborne military equipment. This may enable boundaries between objects to be detected which would not be possible using conventional broad band techniques. The data obtained may also be used to enable a material or gas to be identified from its unique spectral radiance characteristics permitting materials of particular interest to an observer to be flagged up by subsequent processing techniques.

Preferably the processor performs a Fourier transform to ascertain the spectral radiance of each pixel, the spectral radiance of a plurality of pixels advantageously being determined simultaneously. This can be used to enable a real time image to be generated, and preferably the system further comprises an image generator generating an image in which the grey scale is dependant on the spectral radiance of each pixel. The grey scale image can be enhanced prior to being displayed as a colour image in accordance with known techniques.

Where the signal received from object space is weak then the interferometer is preferably scanned a plurality of times in order to enable spectral radiance of the pixels to be ascertained. Also depending on application it may be desirable to perform a non-uniform scan in the time domain with the interferometer to emphasise parts of the sub-band of special interest whilst suppressing parts with less interesting characteristics.

A non-uniform scan occurs when the length of a variable arm of the interferometer is increased in a non-linear manner by introduction, for example of a step function change in position.

In certain applications it is preferable to employ an interferometer which is a solid state device for this avoids the need for any moving parts associated with the interferometer and may enable the complete imager to be a solid state device, a solid state device tending to be more reliable and rugged than a mechanical counter part. To ensure against mis-alignment the optical elements of the interferometer may employ corner cubes as reflectors.

Where the interferometer is a solid state device it preferably comprises a material the refractive index of which may be changed by controlling an electric field across it, such materials being known as an electro-optic modulator, examples being Lithium Niobate and Galium Arsenide. The path length of one leg of the interferometer can be altered by the varying the refractive index of the material by any external means.

To assist in the detection of objects it is preferable that the processor performs an inter array comparison which is best carried out with the interferogram (rather than its Fourier Transform which is die spectral radiance) and a set of standard interferograms stored in a data base, by means of a standard real time correlator. This allocates to each pixel a specific spectral content partly in dependance on the spectral radiance of other pixels. The processor may perform a histogram manipulation according to standard techniques, on spectral radiance values and allocate a grey scale to each pixel in dependance on the number of pixels having a value in any one range in order to maximise grey scale contrast. Such a technique results in all pixels having a similar spectral radiance being assigned a certain grey scale value making any shape comprising those pixels easier to identify in a resultant image. Alternatively an equivalent technique would be to associate the histogram with a range of colours and create a false colour image.

Advantageously the system may further comprise a polarimeter for receiving radiation from the same object space as radiation received by the interferometer, the processor combining data received from the polarimeter with that data received from the array of detector elements to obtain a score for each pixel. Similarly, or in addition to, the system may further comprise a camera for receiving radiation over the range of wavelengths of interest from the same object space as radiation is received by the interferometer. The output of the camera may then provide intensity data which is combined by the processor with that received from the said array of detector elements to obtain a score for each pixel. The data from the different sources is preferably combined by a fusion algorithm based on standard statistical techniques within the processor, the score attained representing the level of interest for a particular pixel. For example a particular pixel or group of pixels will score highly if the spectral radiance and/or polarisation and/or intensity is substantially different to that of adjacent pixels since such an event would imply an anomaly in target space that would be worth considering/investigating further.

One embodiment of the present invention will now be described by way of example with reference to the accompanying drawings of which:

Figure 1A:
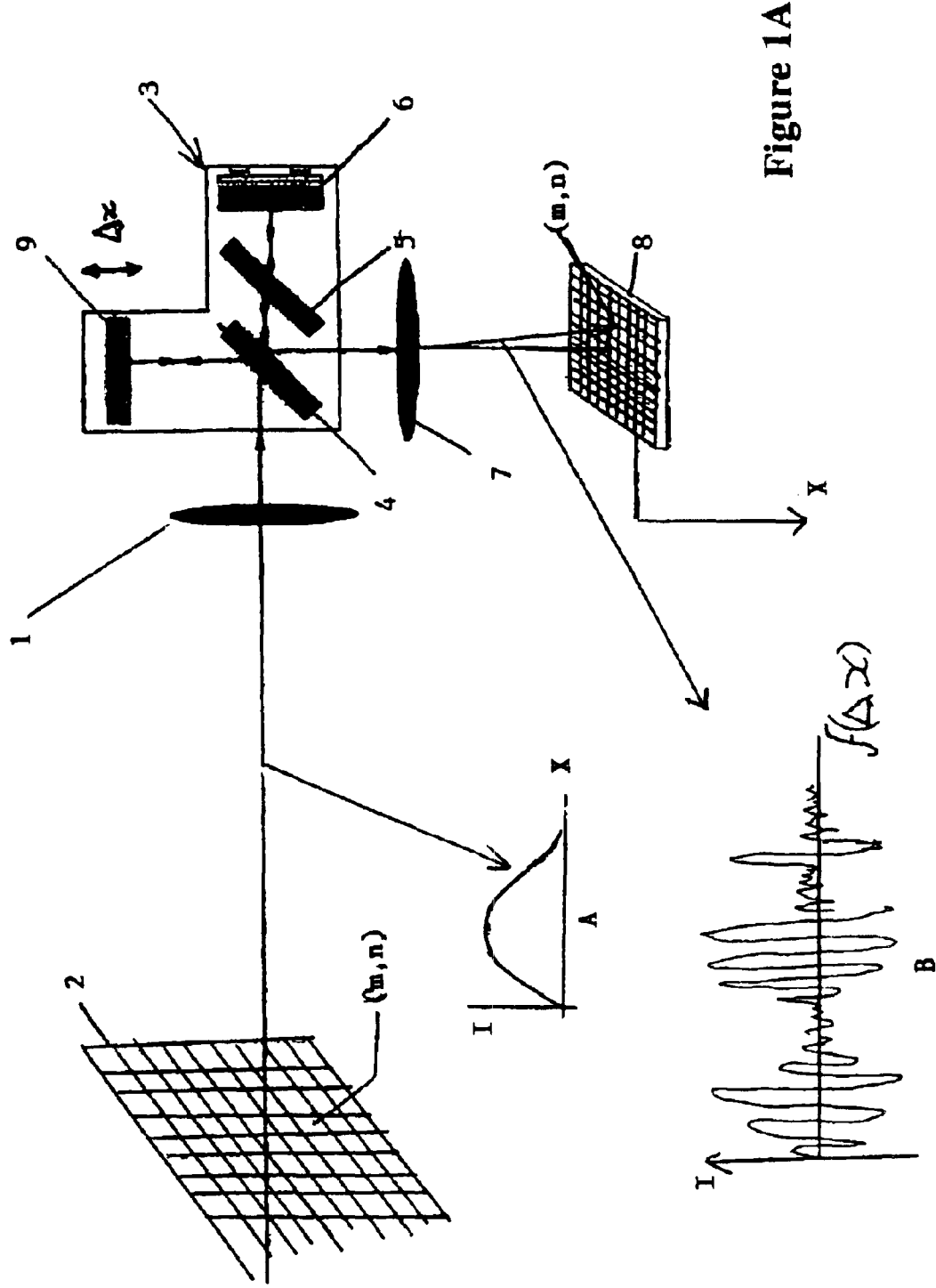
FIGS. 1A and 1B illustrate an imaging system in accordance with the present invention.

Referring to FIG. 1A an imaging system in accordance with the present invention comprises an aperture 1 for receiving an image from object space, represented by grid 2. Radiation received through the aperture 1 enters Michelson interferometer 3 where it is split into two optical paths by semi silvered optic 4. The first optical path passes through compensation element 5 to mirror 6 where it is reflected back through the compensation element 5, off the semi silvered surface of mirror 4 through collimator 7 to be incident on an array of the detector elements 8 at the focal plane.

The second optical path is reflected off the rear surface of semi silvered optic 4 to optical element 9. This comprises a material the refractive index of which is controlled by an applied electric field. Light passing through the material is reflected off the silvered rear surface back through the material and a change in the path length is introduced by progressively altering the applied voltage. This is equivalent to scanning a mirror through a distance $\Delta x$. The second optical path then passes through semi silvered optic 4 and is recombined with the first optical path such as to cause constructive and destructive interference depending on the relative phase of the light in the two optical paths.

The focal plane array comprises a two dimensional array of detector elements, each detector element (m,n) defining a pixel (m,n) corresponding to a region of object space represented by one square of lurid 2. As the path length of one leg of the interferometer is varied by $\Delta x$ the spectral radiance associated with each region of object space causes an interference pattern to be generated, such that the associated detector element (m,n) of the array detects a series of fringes passing across it, resulting from constructive and destructive interference of the two light paths within the Michelson interferometer 3. Thus the spectral radiance from object space corresponding to pixel (m,n), represented by graph A, generates an optical interferogram for pixel (m,n) where the intensity detected by the detector element is a function of $\Delta x$, as represented by graph B. This output for each pixel is received at the input X of a processor illustrated generally by the broken line 10 of FIG. 1B.

Figure 1B:
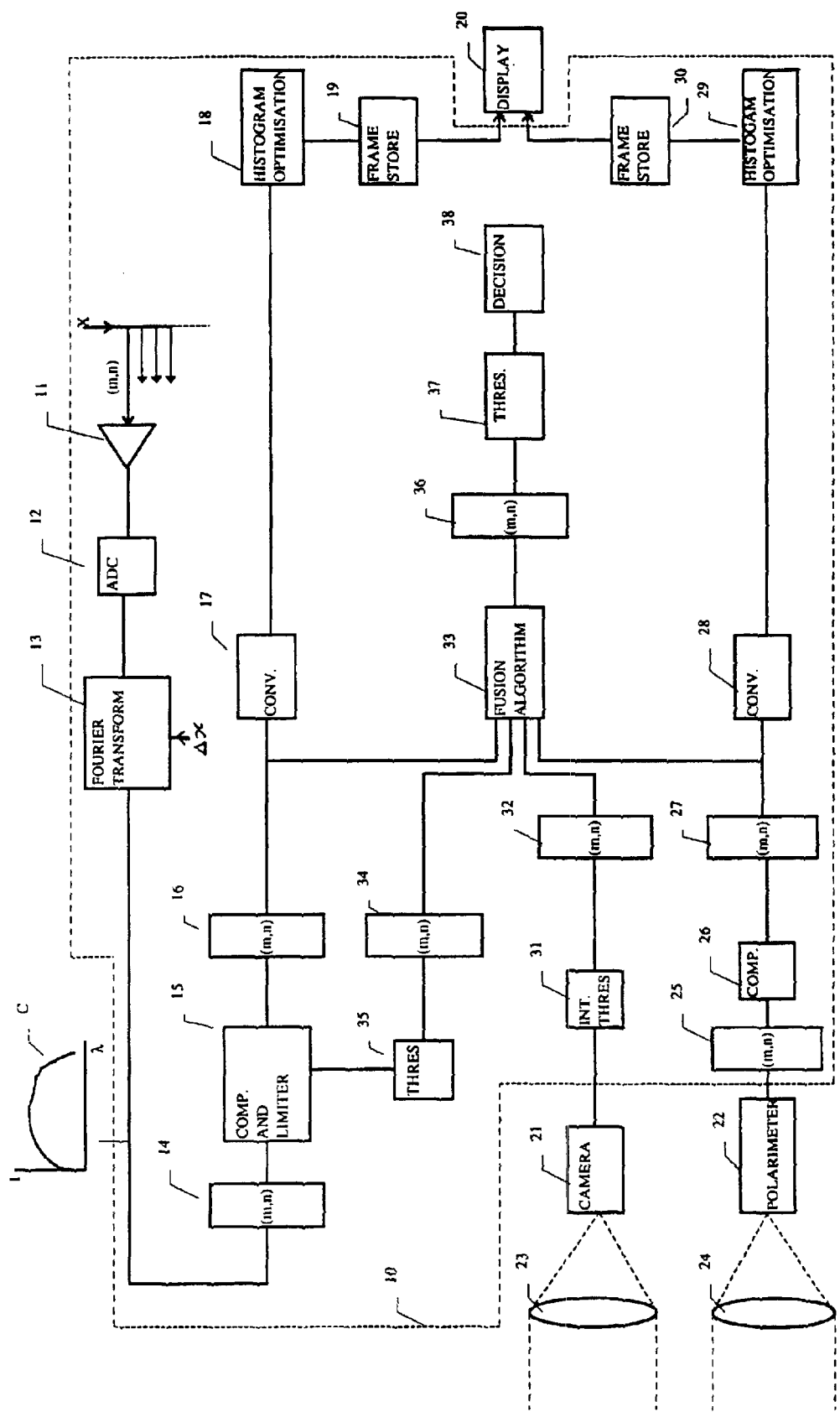

Referring to now to FIG. 1B, the function of the processor is schematically represented by the components contained within broken line 10. In practice the processor may be implemented by any suitable processing means, and may typically one or more micro processors which could be at separate locations. Also the processing may or may not be done in real time. The data received at input X could be received from a storage medium or directly from the focal plane array 8 as shown.

Figure 2:
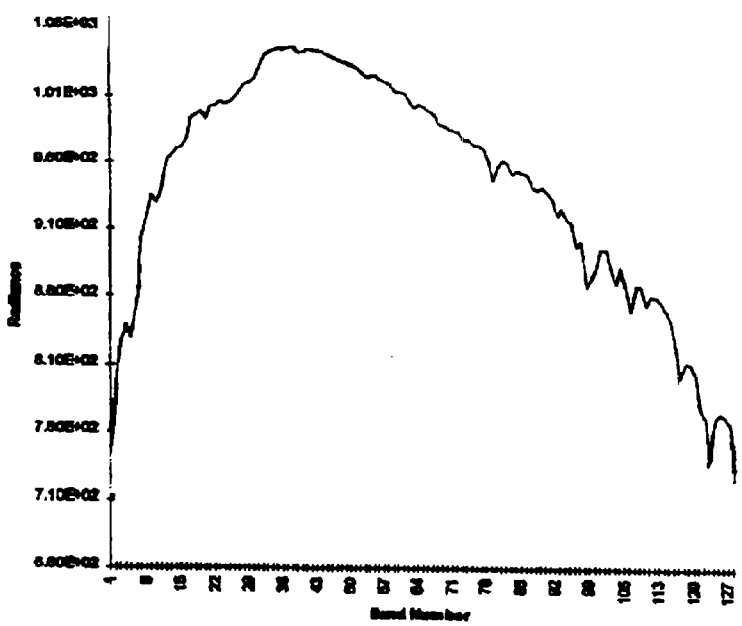
FIG. 2 is an exemplary spectral radiance plot for one particular pixel.

The processor of FIG. 1B controls displacement $\Delta x$ of mirror 9. The signal received at X containing data from each element (m,n) of the display is first amplified by amplifier 11 and then converted to a digital signal by analogue to digital converter 12. A Fourier transform 13 is performed providing a spectral radiance for each pixel (m,n) as a function of $\Delta x$ as indicated by graph C. A typical spectral radiance for an element (m,n) may be as illustrated in FIG. 2. Referring again to FIG. 1B the pixel spectral radiance for each element (m,n) is stored in data file 14. An intra-array comparison 15 is made of the data within data file 14 to !identify pixels having similar values and also to set a limit for associating different pixels with the same spectral content, which limit is a function the noise level of the data and range of the data, in accordance with standard image processing techniques such as an adaptive convolution filter.

Each pixel is thus assigned a spectral data type which is stored in data file 16, the value being selected from one of a set comprising no more than, for example 256 which would match a conventional grey scale display. These values are then converted to a grey scale 17 on which a histogram optimisation is performed to maximise the contrast between the grey levels, before being transferred to frame store 19 prior to display on display 20.

In addition to receiving data from input X the processor 10 also receives inputs from a wide band camera 21 and polarimeter 22 both accurately aligned to view to the same object space, via lens apertures 23 and 24 respectively, such that the pixel output of both the came polarimeter correspond to that of the focal plane array 8 of FIG. 1A.

From the output of the polarimeter 22 a pixel polarisation state data file 25 is generated on which data an intra-array comparison 26 is performed to assign a pixel polarisation type to each pixel, which type is stored in data file 27. This is converted to a grey scale, 28, on which histogram optimisation is performed, 29, and the resultant data stored in frame store 30 for display on the display 20. This, enables an operator to switch between an image generated radiance of a scene and an image generated from polarisation data of the same image. The operator may switch between images by manual intervention or the images may be fused to provide a composite image based on the key features of each image.

The output of camera 21 provides the intensity data for block 31. An intensity threshold is applied at 31 and the pixel intensity is stored in a data file 32.

From the output of block 31 a wide band pixel intensity data file 32 is generated. The content of this data file 32 together with the content of both the pixel polarisation type data file 27 and the pixel spectra type data file 16 is combined by fusion algorithm 33. This algorithm also receives an input from a spectral anomaly data file 34 the content of which is derived from the output of the intra-array comparator and limiter 15, any anomalies identified by the comparator and limiter above a predetermined threshold, 35, being stored in the spectral anomalies data file 34 which contains a list of all pixels which have a spectral radiance different, as set by threshold 35, from the background and neighbouring pixels.

The fusion algorithm 33 processes the received data in accordance with parameters set by the user dependent on the application of the user. The fusion algorithm 33 will produce a score in data file 36 for each pixel, all scores above a threshold, 37, being identified by decision block 38 the output of which can be used either to the flag areas of interest on the display 20 or can identify areas of image which warrant further investigation. The fusion algorithm will produce a score dependent on the relative magnitude of each of the three inputs. A high score will result from a simultaneously measured spectral anomaly, polarisation anomaly and intensity anomaly.

Figure 3:
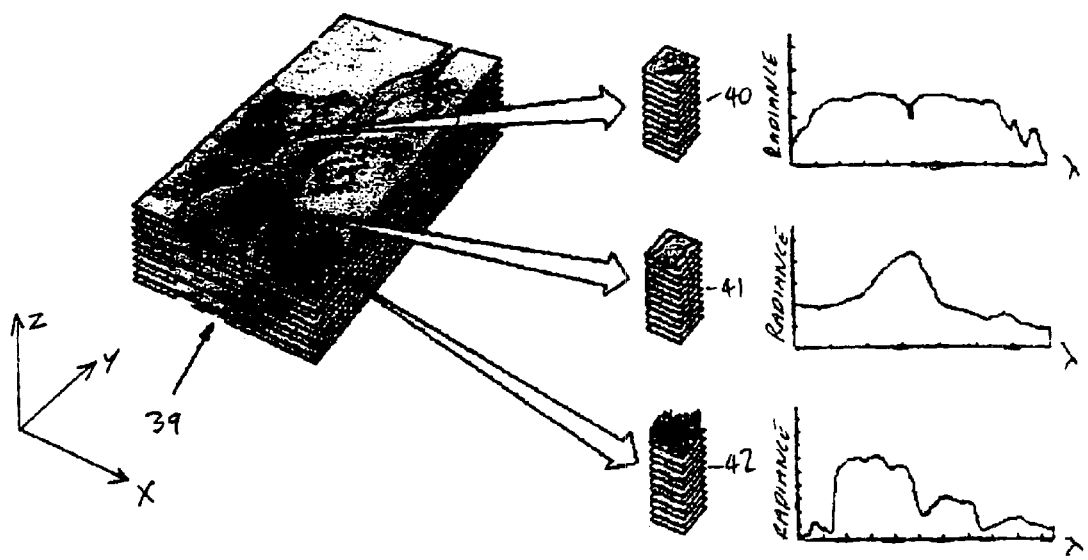
FIG. 3 is a schematic representation of the data generated by the imaging system of FIGS. 1A and 1B.

Referring to FIG. 3 there is illustrated a three dimensional hyper cube created from the data contained within the pixel spectral radiance data file 14 of FIG. 1B. The x and y axis of the hyper cube represent the pixel position in object space, and wavelength is given along the z axis. For any one pixel the spectral radiance may be derived with respect to wavelength, and in the illustrated example three sections 40, 41, and 42 taken through the hyper cube are illustrated with average special radiance plots for each. Each spectral radiance plot can be compared with that for a known object, enabling the type of object or gas to be identified. Such a comparison process may be performed as a consequence of the output of decision block 38 determining that a particular pixel within the image is of interest.

The spectral radiance of typical scenarios will depend on the time of day and the vegetation cover or nature of ground filling the field of a view of the instrument. This information is used to set the spectrometer resolution and other parameters. This is carried out in the processor. An average spectral radiance is calculated and compared with a small data set to establish the best match. This is used to set the operating parameters in a manner which will optimise the sensitivity of the instrument in the detection of anomalies.

The three dimensional hyper cube may be created for polarisation state or intensity as well as for spectral radiance. A five dimensional hyper cube can be created in a suitable mathematical form but cannot be represented in an easily comprehensible manner.

One embodiment of the present invention has been described above by way of example only. However it will be appreciated that the data obtained from the focal plane array 8 of FIG. 1A can be processed in other ways whilst still within the scope of the appended claims.

What is claimed is:

1. An imaging system comprising:
   an aperture for receiving radiation from an object space;
   an interferometer arranged such that radiation received through the aperture is incident thereon;
   an array of detector elements for receiving output radiation from the interferometer;
   a controller for scanning the interferometer through a range of different path lengths, for receiving signals from a plurality of elements of the array, for determining a spectral radiance value for each of a plurality of pixels, each pixel corresponding to one or more elements of the array, and for generating a grey scale image in accordance with the spectral radiance of each pixel; and
   a polarimeter for receiving said radiation from the object space, wherein the controller combines data received from said polarimeter with data received from the array of detector elements to obtain a score for each pixel, the score indicative of a level of interest for each pixel.

2. A system as claimed in claim 1, wherein the controller contains a fusion algorithm stage for combining the data received from the array with data from the polarimeter.

3. A system as claimed in claim 1, wherein the array of detector elements comprises a two-dimensional focal plane array.

4. A system as claimed in claim 1, wherein the controller scans a plurality of times to obtain the spectral radiance of the pixels.

5. A system as claimed in claim 1, wherein the scan of the interferometer is non-uniform.

6. A system as claimed in claim 1, wherein the interferometer is a solid state device.

7. A system as claimed in claim 6, wherein the interferometer comprises a material having a variable refractive index, wherein path length of one leg of the interferometer is altered by varying the refractive index of the material.

8. A system as claimed in claim 1, wherein the controller includes a Fourier transform stage for obtaining the spectral radiance of each pixel.

9. A system as claimed in claim 8, wherein the spectral radiance for a plurality of pixels is determined simultaneously.

10. A system as claimed in claim 1, further comprising a display, wherein the spectral radiance value is processed to provide on the display a pseudo three dimensional cube with two perpendicular axes corresponding to the co-ordinates of the image and the third mutual perpendicular axis corresponding to wavelength of radiation received.

11. A system as claimed in claim 1, wherein the controller includes an intro-array comparison stage which allocates each pixel a specific spectral content dependent at least in part upon the spectral radiance of other pixels.

12. A system as claimed in claim 1, wherein the controller includes a histogram manipulation stage which operates on a spectral radiance value, a grey scale value being allocated to each pixel in accordance with the number of pixels having a value in any one range to maximise grey scale contrast.

13. A system as claimed in claim 1, further comprising a camera for receiving radiation over the range of wavelengths of interest from the object space as radiation is received by the interferometer, the output of the camera providing intensity data which is combined by the processor with that received from the array of detector elements from the polarimeter to obtain a score for each pixel.

14. A system as claimed in claim 1, further including an additional lens aperture, wherein said polarimeter receives light from the object space through said additional lens aperture.

* * * * *